V. W. JENSEN.
DUST HOOD FOR VEHICLE TOPS.
APPLICATION FILED AUG. 29, 1917.
1,266,598.
Patented May 21, 1918.
3 SHEETS—SHEET 1.
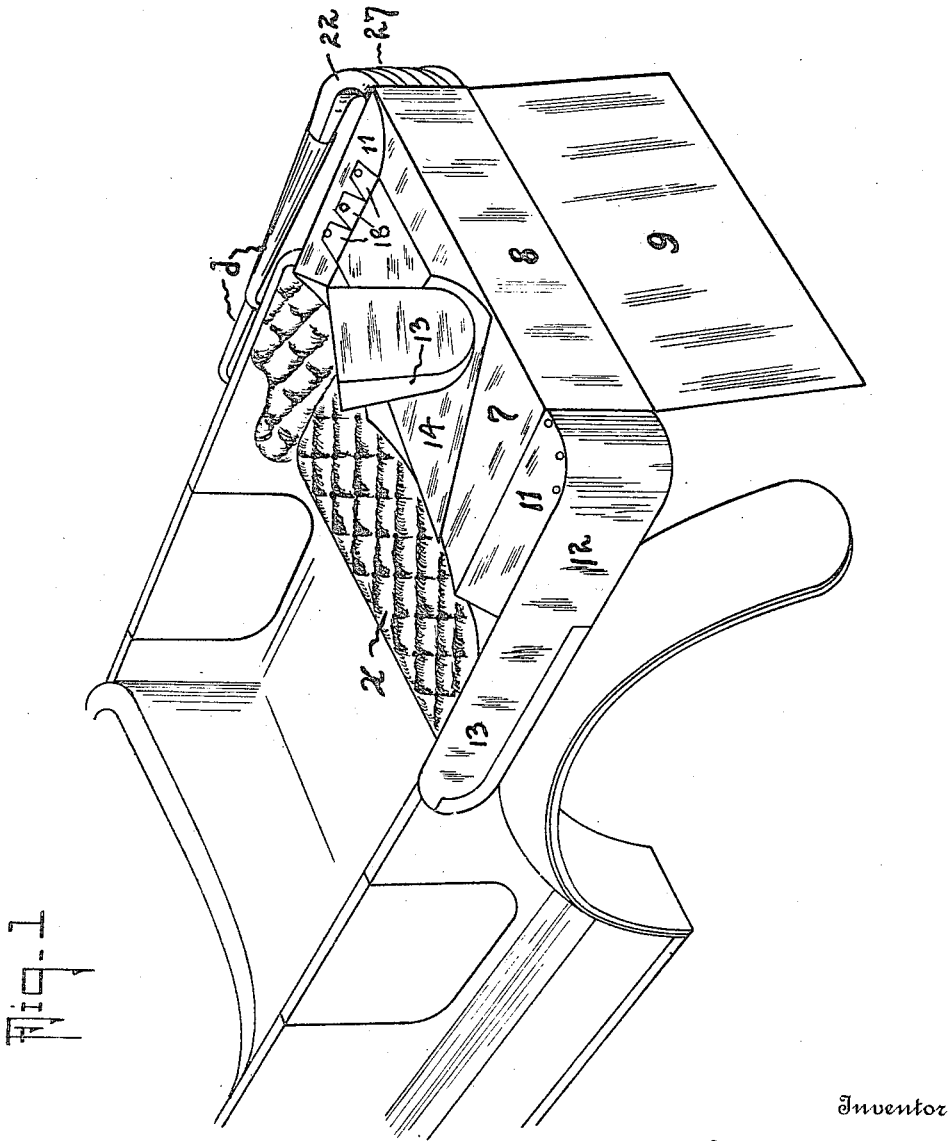
Inventor
Vernon W. Jensen
By Arthur H. Sturges,
Attorney

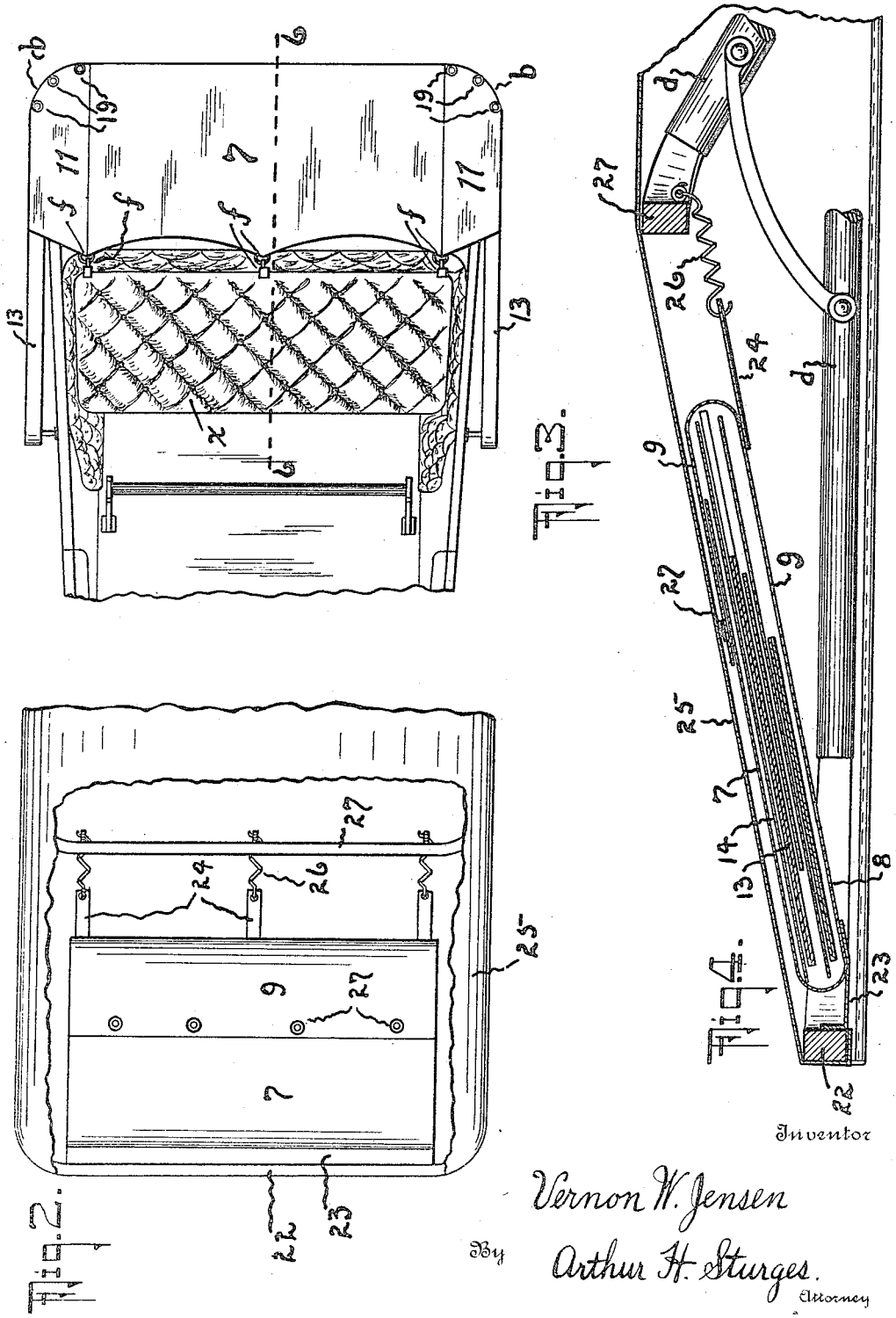

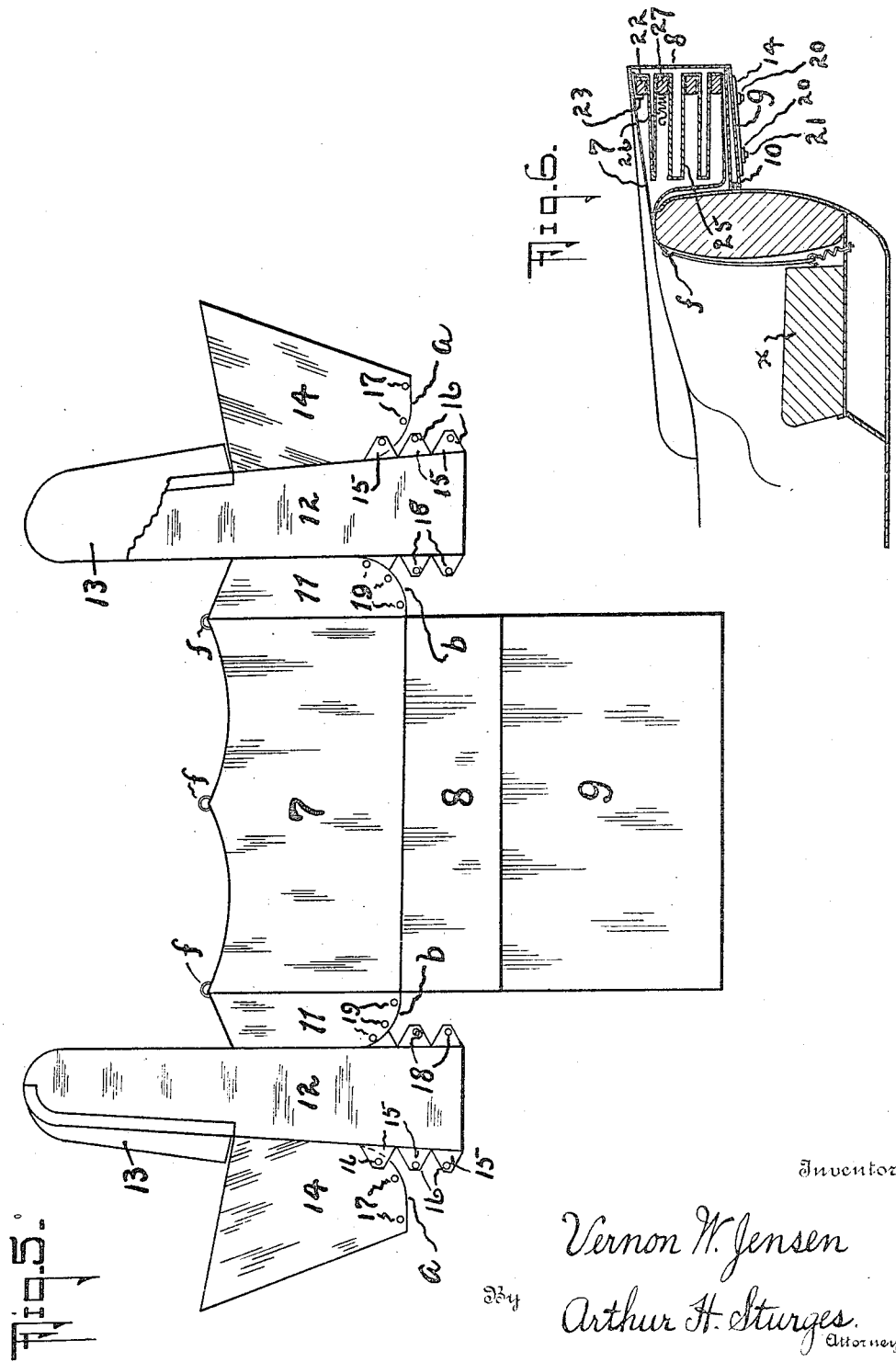

UNITED STATES PATENT OFFICE.

VERNON W. JENSEN, OF COUNCIL BLUFFS, IOWA.

DUST-HOOD FOR VEHICLE-TOPS.

1,266,598.  Specification of Letters Patent. Patented May 21, 1918.

Application filed August 29, 1917. Serial No. 188,854.

*To all whom it may concern:*

Be it known that I, VERNON W. JENSEN, a citizen of the United States, residing at Council Bluffs, in the county of Pottawattamie and State of Iowa, have invented certain new and useful Improvements in Dust-Hoods for Vehicle-Tops, of which the following is a specification.

This invention relates to a dust hood for the tops, bows and bow supports of automobiles or other like vehicles, and has for its object to provide a flexible hood consisting of parts which will cover practically all of the metallic parts as well as the leather or canvas parts of the vehicle top, when said top is folded. The invention also has reference to such a construction and arrangement of parts that the hood may be connected with the front bow of the vehicle top, may be convenient for extension or folding, and when not in use will be housed in a manner to be unobtrusive to the occupants of the vehicle.

With the foregoing objects in view the invention presents a novel construction, combination and arrangement of parts as described herein and claimed, and as illustrated in the accompanying drawing, wherein,—

Figure 1 is a perspective view showing a part of a vehicle, the device being applied thereto and shown partly folded. Fig. 2 is a broken away, plan view of the front part of a vehicle top, showing the hood folded when the top is extended. Fig. 3 is a plan view of the rear part of a vehicle, the top being folded and the hood applied. Fig. 4 is a sectional view, longitudinally of the vehicle, through the top, when extended, said view being on an enlarged scale and being a detail relating to Fig. 2. Fig. 5 is a partly broken diagrammatic view of the hood to clearly show the several parts thereof. Fig. 6 is a sectional view on line 6 6 of Fig. 3.

It will be understood that when the top of an automobile is erect or extended, it protects all of the parts below said top to a greater or less extent, but when the top is folded rearwardly and disposed substantially horizontal, the bows and flexible top are exposed to accidental injury, collection of dust and sun heat. For this purpose various dust covers have heretofore been provided more or less effective for excluding the dust, but have not been formed or arranged to be secured to the vehicle in a manner to prevent them from being obtrusive, or injured, or liable to loss, when the top has been extended.

Referring now to the drawing for describing one embodiment of the invention, the foldable hood consists of a substantially rectangular part 7 adapted, when the top has been folded, to lie upon that part of the cover rearwardly of the rear seat $x$, and to be secured to the back of the seat by means of suitable fasteners $f$, rectangular parts 8 and 9, suitably connected, and connected with the part 7 being provided for covering, respectively, the rear and lower sides of the folded top, the part 9 being secured upon the lower side of the folded top by means of suitable fasteners 10 to the body of the car.

Numerals 11 indicate a pair of wings formed at the ends of the part 7, adapted to cover the ends of the folded top, and at 12 are elongated strips disposed outwardly of and connected with the wings 11 adapted to lie upon a part of the folded bow supports $d$, each strip 12 being provided with a pocket 13 at its front end and projecting forwardly thereof for covering the front ends and sides of the folded bow supports $d$, said strips 12 being provided at their outer edges with a pair of triangular wings 14.

The rear ends of the strips 12, at their outer sides or edges, are provided with short tabs 15 or equivalent holder-members having fastening devices 16 adapted to coöperate with fastening devices 17 with which the curved edges $a$ of the wings 14 are provided, the inner edges of the strips also having fastening devices 18 for being connected with fastening devices 19 with which the curved, rear ends $b$ of wings 11 are provided, whereby the folded bow supports $d$ and entire top will be housed from dust, rain or sun heat, a structure of rectangular box form being thereby provided for covering all of the parts, the triangular wings 14 being secured to the side of the part 9 by means of fastening devices 20 coöperating with the fastening devices 21 of said part 9.

In order that the hood may be accessible at all times when it is desired to lower the top, it is secured to the front bow 22, and it may be readily placed and secured in the position described.

The inner side of the hood is provided at and parallel with the junction of parts 7 and 8, with a flap 23, this flap being secured by any suitable means to the front bow 22; and the inner side of the part 9 is provided with a suitable holder or holders, as the tabs 24; and after the several wings and their attached parts have been folded between the parts 7, 8 and 9 to form a flat bundle, as best shown in Figs. 2 and 4, the hood thus folded and in compact form may be secured and held adjacent to the top 25, springs 26, secured to the bow 27, adjacent to the bow being provided, and adapted to normally maintain the hood when thus folded and disposed, so that it will not be obtrusive.

The convenience in the use of the device thus described will be appreciated since it is connected at all times with the front bow. When it is desired to move the top from a folded to an upright position, the operator, after releasing the fastening devices and without disturbing the part 7, folds the parts 11, 12 and 14 inwardly from the ends of said part 7, the strips 12 being folded upon themselves and pressed flatwise upon the upper side of the part 7, the parts 8 and 9 then being moved over and forwardly of the folded parts mentioned, a part of member 9 extending beyond and forwardly of the free edge of member 7 and secured to the last named member by means of buttons 27 or equivalent fastening means, the parts thereby forming a flat case or bundle secured to the bow 22 by means of the flap 23, and when the top is elevated, the hood thus incased by members 7, 8 and 9 will, of course, be carried forwardly with the front bow 22, being dependably supported thereby. It is then swung rearwardly to the position shown in Fig. 4, and by action of the springs 26 which are removably connected with the tabs 24, it will be maintained adjacent to the top.

When it is desired to lower the top, the operation, as described, is reversed. The device, on account of its construction and operation, is convenient in use, and when not in use is housed from the weather in a position not liable to obtrude, and on account of the use of the springs, the bundle will be held in a taut condition in a remote part of the vehicle in such a manner that the parts will not be subjected to wrinkling or creasing, as might be the result if kept elsewhere.

Having fully described my invention, what I claim and desire to secure by Letters Patent is,—

Devices for the purpose described, comprising, in combination with the front bow of a collapsible vehicle top, a hood consisting of connected, flexible sections with wings and adapted to be folded with its sections disposed outwardly of its wings and having one of its sections mounted upon the front bow of said vehicle top, resilient means for normally maintaining the folded hood adjacent to the top rearwardly of said front bow, said hood being adapted to move with the front bow and to be unfolded when the top is collapsed to dispose its sections in engagement with the vehicle top and to dispose its wings in engagement with said bow.

In testimony whereof I have affixed my signature in presence of two witnesses.

VERNON W. JENSEN.

Witnesses:
  RAYMOND D. BALMOOR,
  HIRAM A. STURGES.

Copies of this patent may be obtained for five cents each, by addressing the "Commissioner of Patents, Washington, D. C."